United States Patent
Piotte et al.

(10) Patent No.: US 7,412,166 B2
(45) Date of Patent: Aug. 12, 2008

(54) PILOT TONES FOR OPTICAL SIGNAL WAVELENGTH IDENTIFICATION AND POWER MEASUREMENT

(75) Inventors: Martin Piotte, Pierrefonds (CA); Georges Désilets, LaPrairie (CA)

(73) Assignee: Tellabs Operations, Inc., Naperville, IL (US)

( * ) Notice: Subject to any disclaimer, the term of this patent is extended or adjusted under 35 U.S.C. 154(b) by 669 days.

(21) Appl. No.: 10/426,911

(22) Filed: Apr. 30, 2003

(65) Prior Publication Data

US 2004/0218920 A1    Nov. 4, 2004

(51) Int. Cl.
*H04B 10/08* (2006.01)
(52) U.S. Cl. ............... 398/32; 398/30; 398/33
(58) Field of Classification Search ............. 398/30–33, 398/38
See application file for complete search history.

(56) References Cited

U.S. PATENT DOCUMENTS

| | | | | |
|---|---|---|---|---|
| 5,463,487 A * | 10/1995 | Epworth | ...... | 398/79 |
| 5,812,297 A * | 9/1998 | Mussino et al. | ...... | 398/198 |
| 6,252,693 B1 * | 6/2001 | Blauvelt | ...... | 398/194 |
| 6,327,250 B1 * | 12/2001 | Chen et al. | ...... | 370/241 |
| 6,490,071 B2 * | 12/2002 | Logan et al. | ...... | 394/194 |
| 6,535,315 B1 * | 3/2003 | Way et al. | ...... | 398/182 |
| 6,839,523 B1 * | 1/2005 | Roberts | ...... | 398/177 |
| 2003/0025957 A1 * | 2/2003 | Jayakumar | ...... | 359/110 |
| 2003/0067647 A1 * | 4/2003 | Wan et al. | ...... | 359/124 |
| 2003/0067651 A1 * | 4/2003 | Wan et al. | ...... | 359/133 |

OTHER PUBLICATIONS

"High-Resoloution Multi-tone signal generators," 2002 IEEE, pp. 245-250 to Lin et al.*

* cited by examiner

*Primary Examiner*—Dzung D Tran
(74) *Attorney, Agent, or Firm*—Davis & Associates; William D. Davis

(57) ABSTRACT

A method of optical communication includes providing a plurality of optical signals each associated with a distinct channel of a composite optical signal. A unique pilot tone signature is superimposed on each channel. The spectral composition of each signature includes a plurality of frequencies. In one embodiment, binary frequency shift keying at a frequency $f_m$ is used to shift between instantaneous frequencies $f_1$ and $f_2$ wherein $f_2+\Delta f = f_1 - \Delta f = f_c$. Choosing $$\frac{\Delta f}{f_m} \approx 1.1602$$

produces a spectrum having a plurality of dominant components at least some of which have substantially the same amplitude. A method of detecting the presence of a selected pilot tone signature having a plurality n of dominant spectral components $F_1 \ldots F_n$ includes generating a power spectrum $P_0(f)$. $S_k(f)$ is calculated as a product of a plurality of frequency shifted versions of $P_0(f)$, where $k \in \{1 \ldots n\}$. The existence of a dominant spectral component at $F_k$ indicates the presence of the selected pilot tone signature.

23 Claims, 9 Drawing Sheets

US 7,412,166 B2

PILOT TONES FOR OPTICAL SIGNAL WAVELENGTH IDENTIFICATION AND POWER MEASUREMENT

FIELD OF THE INVENTION

This invention relates to the field of optical communications networks. In particular, this invention is drawn to wave division multiplexed optical communication systems.

BACKGROUND OF THE INVENTION

Optical communications networks are used to transport large amounts of voice and data through fiber optic cables. Wave-division multiplexing (WDM) can be used to transmit multiple channels of optical information through the same optical fiber. Multiple channels are carried in the same fiber by assigning different optical wavelengths to each channel. Data is communicated within a particular channel by pulses of optical energy using the wavelength assigned to that channel.

The optical signals degrade over distance such that re-generation or re-amplification may be required. Moreover, the channels within a fiber tend to degrade at different rates. Accordingly, determination and regulation of optical power on a channel-by-channel basis is desirable.

One technique used to enable optical power measurement on a channel-by-channel basis is to assign and introduce a sinusoidal pilot tone into each channel. Within a given fiber, each channel has a pilot tone distinct from the pilot tone of any other channel for the purpose of power calculations. The presence and power of a given channel is inferred by the presence of the pilot tone associated with that channel in the composite optical signal.

The spectral components contributed by the data for any channel may interfere with the pilot tone associated with a selected channel. For example, spectral peaks introduced by the framing pattern at multiples of the data frame rate can be mistaken for the pilot tone of the associated channel or any other channel. The data may have recurring patterns that introduce spectral components indistinguishable from the pilot tone. The spectral contributions from the data carried by any channel can create a false indication of the power or presence of the pilot tone of a selected channel.

Optical network management is compromised as a result of the false indications. Loss of a channel may not be detected as a result of a false positive. Detecting and locating faults within the optical network is made more complicated as a result of the false indications. Incorrect estimates of the channel power due to the spectral contributions of the data can result in improper amplification of a selected channel thus reducing the quality of the selected channel.

SUMMARY OF THE INVENTION

In view of limitations of known systems and methods, various methods and apparatus for communicating an optical signal are provided. One method of communicating an optical signal includes providing an optical source generating an optical signal. A pilot tone signature comprising a plurality of distinct tones or frequencies is superimposed on the optical signal.

In one embodiment, a plurality of optical sources each associated with a distinct channel of a composite optical signal is provided. A distinct pilot tone signature is superimposed on each channel. The spectral composition of each distinct pilot tone signature includes a plurality of tones or frequencies.

In one embodiment, the plurality of tones is generated sequentially, one at a time for each channel. Alternatively, the plurality of tones for a selected channel is generated substantially simultaneously. Techniques for generating the plurality of tones include frequency or phase shift keying pilot tone source about a center frequency $f_c$ to produce a pilot tone with a varying instantaneous frequency. Binary frequency shift keying with a square wave of frequency $f_m$ is used to shift between instantaneous frequencies $f_1$ and $f_2$, wherein $f_2 + \Delta f = f_{1-\Delta f = f_c}$. In one embodiment, $f_1$ and $f_2$ are selected so that $$\frac{\Delta f}{f_m} \approx 1.1602$$

to produce a spectrum having a plurality of dominant components having substantially the same amplitude.

A method of detecting the presence of a selected multi-tone pilot tone signature having a plurality n of dominant spectral components $F_1 \ldots F_n$ includes generating a power spectrum $P_0(f)$. The product $S(f) = \Pi_{i=1}^{n} P_0(f - (F_k - F_i))$ is computed, where $k \in \{1 \ldots n\}$. The existence of a dominant spectral component at $F_k$ indicates the presence of the selected multi-tone pilot tone. In one embodiment, $F_k = F_c$.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
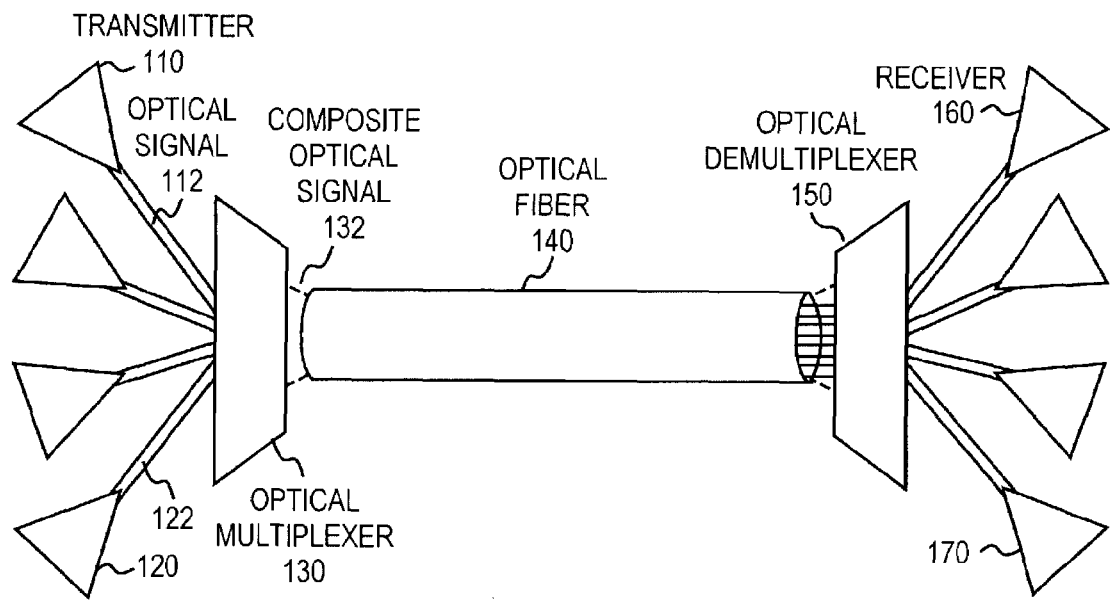
FIG. 1 illustrates optical multiplexing a plurality of optical signals into an optical fiber.

FIG. 1 illustrates one embodiment of an apparatus for optically multiplexing a plurality of optical signals into an optical fiber. Optical source transmitters 110-120 generate source optical signals 112-122. The optical signals are combined into a composite optical signal 132 using an optical multiplexer 130. The multiplexed signals are communicated through optical fiber 140. Optical demultiplexer 150 demultiplexes the composite optical signal 132 to recover the individual source optical signals for receivers 160-170.

Each optical source signal 112-122 represents a different communication channel. In order to ensure that the channels can be multiplexed and demultiplexed, the source optical signals are distinguished by wavelength. In particular, optical source transmitters 110-120 generate optical signal carriers having distinct wavelengths such that no two optical signals being multiplexed use carriers of the same wavelength. This method of communicating a plurality of optical signals of different wavelengths simultaneously using the same optical fiber is referred to as wave division multiplexing (WDM).

FIG. 1 is a simplified overview of WDM over a single optical fiber. In order to enable routing of optical signals sourced from different locations and routed to other possibly distinct locations, an optical network is typically more sophisticated than the overview illustrated in FIG. 1

Figure 2:
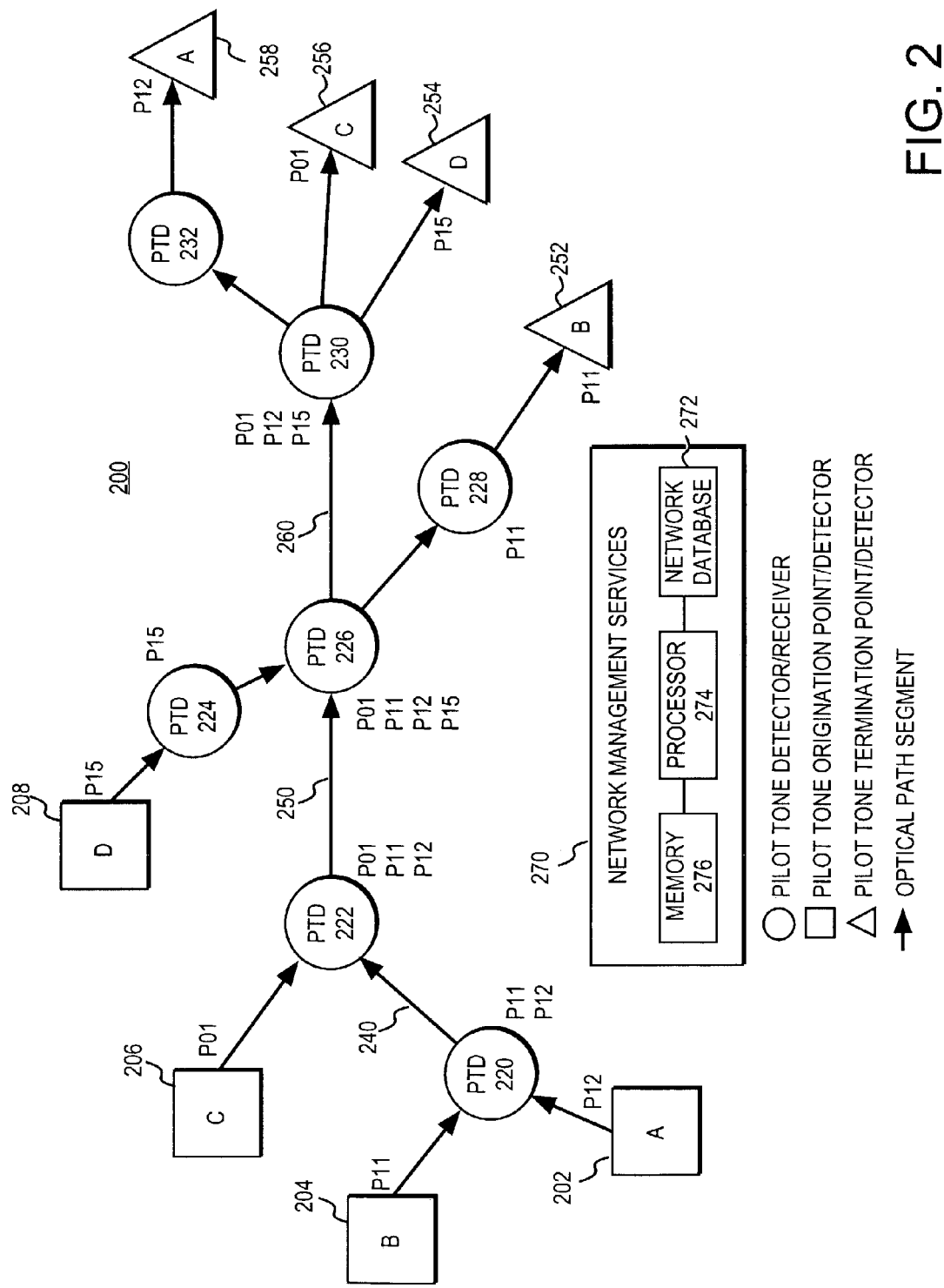
FIG. 2 illustrates one embodiment of an optical network.

FIG. 2 illustrates one embodiment of an optical network 200. The network includes a plurality of nodes identified as optical transmitter nodes 202-208. Each optical transmitter is connected to the optical network through an optical path segment such as 240. The optical path segments comprise one or more optical fibers. The direction of the optical signal transmission is also illustrated.

Before terminating at termination nodes such as receiving nodes 252-258, the optical signals typically pass through a number of intermediate nodes that may perform functions such as routing, amplification, or regeneration of the optical signals. For example, transmitter node 206 is coupled to termination or receiving node 256 through one or more routing nodes (222, 226, 230) and optical path segments (250, 260, etc.). These components form a selectable optical path.

In order to manage the network, a technique for identifying the presence and strength of individual channels at intermediate nodes is required. Demultiplexing composite optical signals for purposes of analysis and then re-multiplexing them at each intermediate node is not practical. One technique introduces a sinusoidal pilot tone onto individual channels. Each pilot tone is superimposed on individual channels at their respective optical sources.

Referring to FIG. 2, each of the nodes 202-208, 220-232, and 252-254 is capable of scanning a composite -optical signal to identify the presence of any pilot tones. The optical transmitters are also the pilot tone origination points. The pilot tones located in a composite optical signal passing through a particular node are indicated near the node as appropriate. Pilot tones associated with a pilot tone origination point indicate the pilot tones being transmitted. Pilot tones associated with a pilot tone detector (PTD) or a pilot tone termination point indicate the pilot tones being received. PTD 226, for example, is receiving pilot tones identified as P01, P11, P12, and P15.

Network management services 270 maintain a database 272 identifying the physical configuration of the network such as optical channel source and termination nodes as well as the interconnection (e.g., 240, 250, 260) of the nodes. Processor 274 retrieves program code from memory 276 for execution. The processor is capable of querying or updating the database 272 in accordance with instructions stored in memory 276. This database is particularly useful when physically modifying the network such as to move, replace, add, or remove nodes or interconnections between nodes. Connections between network management services 270 and the remainder of the optical network 200 are not shown so as not to obscure the example.

The use of pilot tones to identify individual channels within a fiber also enables identifying configuration errors in the database or connectivity errors in the network. In addition, detection of the optical paths provides a diagnostic tool for locating missing optical signals or resolving extra optical signals in the network 200. The measured optical power of the pilot tones is also used to infer the total mean optical signal power of a particular channel. Knowledge of the total mean optical output power at various points of the network is useful for performing network diagnostics as well as to facilitate transmission of the optical signals throughout the network. The measured optical power of a particular pilot tone is used to infer the mean optical power of the particular channel that pilot tone is associated with.

The pilot tone origination nodes generate the pilot tone by modulating an optical source. Typically, the optical source is a laser. The laser is provided with a DC source bias and the pilot tone signal is superimposed as an AC source bias. Data is transmitted by further modulation of the optical signal. Prior art pilot tone sources generate a sinusoidal waveform having a fixed tone or frequency ($f_p$) such that the pilot tone source is monotonic. A prior art pilot tone source thus contributes a single dominant component (at $f_p$) to the spectral composition of an optical signal.

Figure 3:
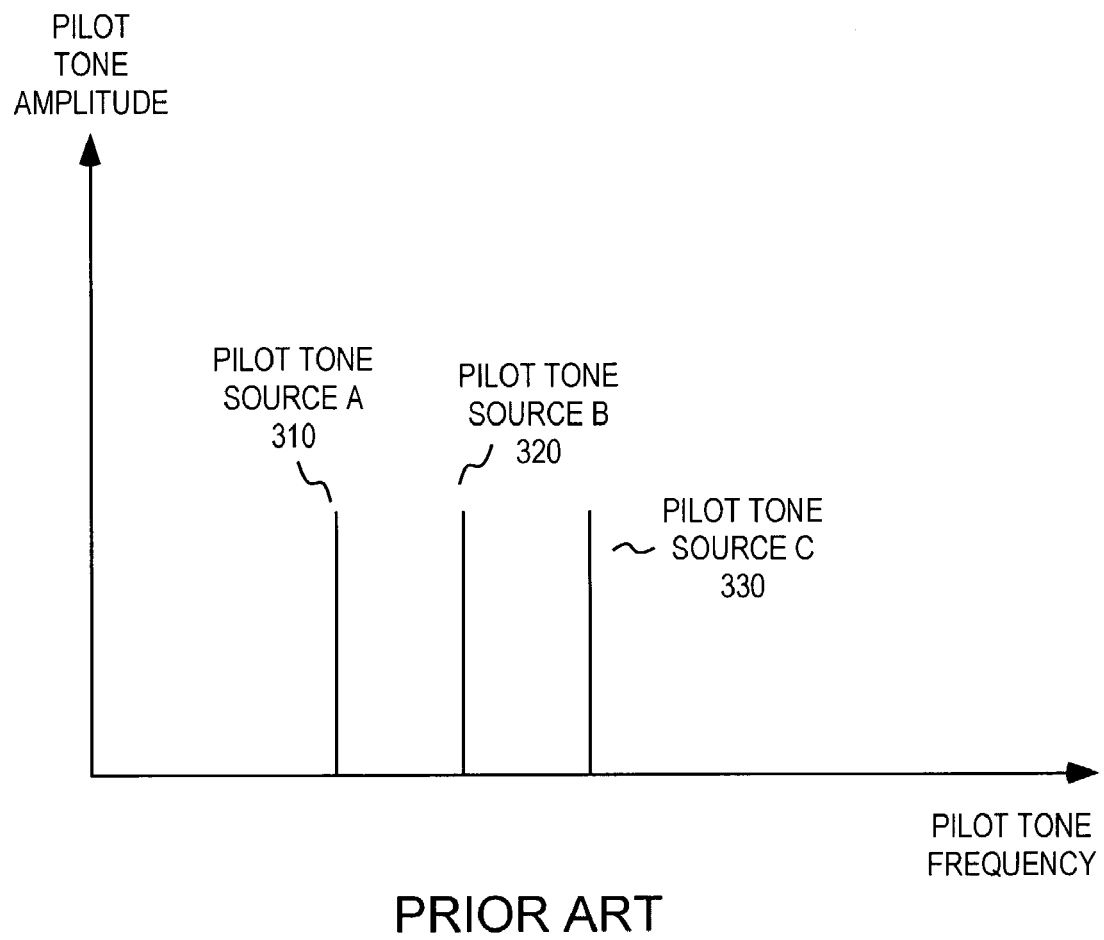
FIG. 3 illustrates spectral content of a plurality of monotonic pilot tone sources.

FIG. 3 illustrates the spectral composition of the output of prior art pilot tone sources. Prior art pilot tone sources generate a substantially sinusoidal waveform at a singular predetermined frequency (i.e., monotonic). Thus the output for a selected pilot tone source (e.g., pilot tone source A) is a single spectral component 310. In the event that the pilot tone source is not a pure sinewave, the output still includes a dominant spectral component 310 and additional components (not illustrated) of negligible amplitude.

Each channel carried by an optical fiber is associated with a different pilot tone source having a frequency distinct from that of the pilot tone source associated with other channels in the same optical fiber. Thus pilot tone sources A, B, and C have singular, distinct spectral components as indicated by components 310, 320, and 330, respectively. These pilot tones act as "signatures" for identifying the presence and optical power of individual channels within the optical fiber.

Optical traffic transported on individual channels typically exhibits some periodicity as a result of data structures or frame formats ("digital wrapper") used for communicating the data. This periodicity can introduce spectral components near that of the pilot tone creating difficulties for accurate detection. Aside from frame formats, the data within the digital wrapper may itself consist of patterns that result in the introduction of spectral components near that of a pilot tone. Thus detection of individual pilot tones in an optical signal is complicated by the spectral composition of the payload from all of the channels carried by the optical fiber.

For example, given two channels A and B, the spectral composition of the payload of channel A may result in a false positive for the presence of channel B even if channel B is not actually present as a result of a network failure. Even if channel B is present, the contribution of the spectral components of the payload from either channel A or channel B near channel B's pilot tone frequency can result in an incorrect estimation of the power of the pilot tone. This in turn results in an incorrect estimation of the power of channel B itself.

In order to reduce false positives, the signature of the pilot tone is modified. Instead of a single monotonic pilot tone, each channel is provided with a multi-tone pilot tone. Each pilot tone source modulates its associated channel with a plurality (n) of frequencies instead of a single frequency. The pilot tone contribution to the spectral composition of a single channel thus comprises a plurality of dominant components. A unique combination of dominant spectral components uniquely identifies each channel.

Figure 4:
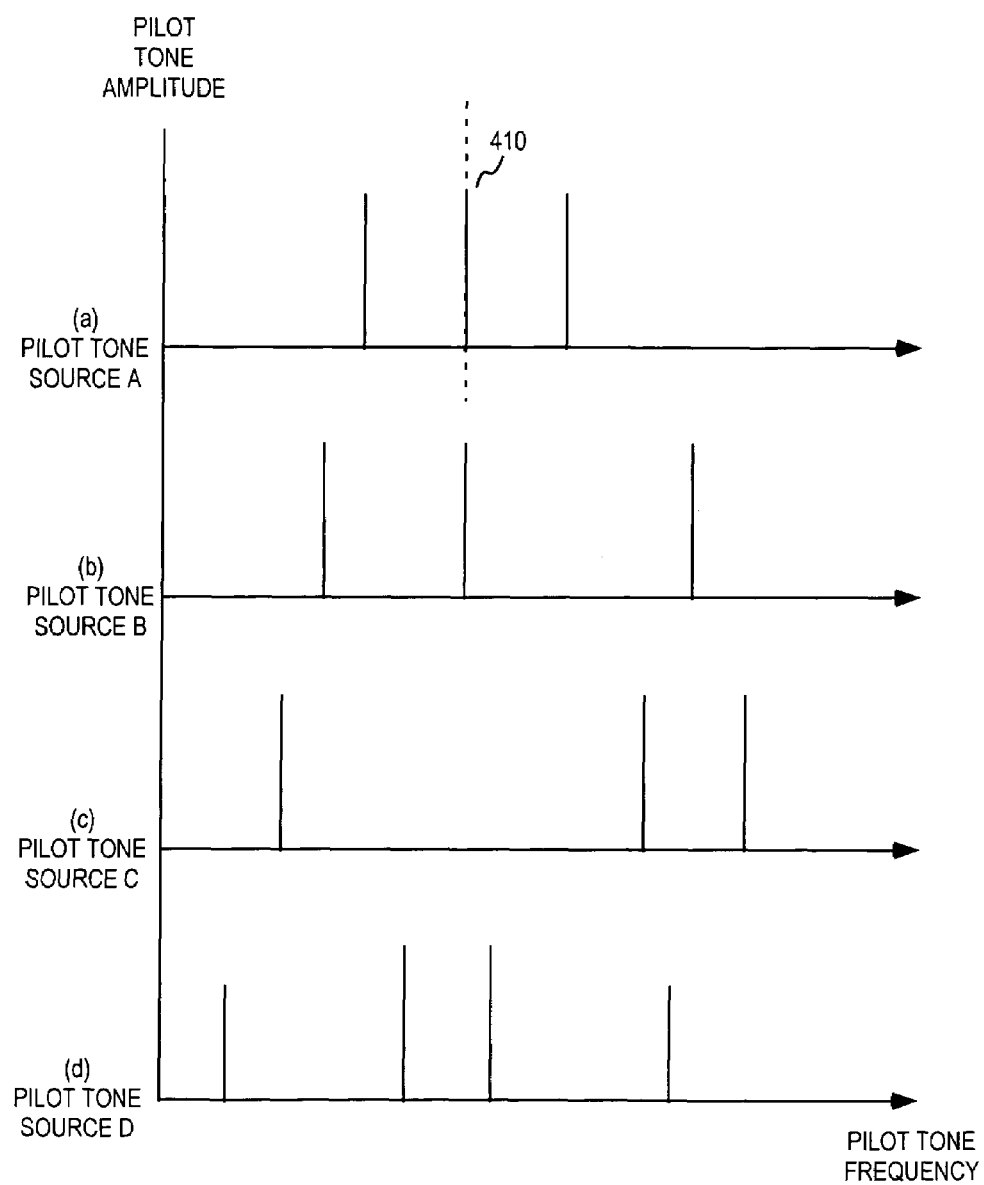
FIG. 4 illustrates embodiments of the spectral content of a plurality of multi-tone pilot tone sources.

FIG. 4 illustrates one embodiment of the spectral component contributions of four multi-tone pilot tone sources (A, B, C, D). In the illustrated embodiment, pilot tone sources A, B, and C each contribute 3 spectral components (n=3). Source D contributes 4 spectral components. The frequencies may be selected such that the pilot tone sources do not use any of the same frequencies as indicated by comparing compositions 4(a) and 4(c) or compositions 4(b) and 4(c). In one embodiment, the amplitudes of the most dominant spectral components are substantially the same. In an alternative embodiment, the amplitude of the dominant spectral components varies.

Alternatively, the pilot tone sources may share one or more spectral components as long as the individual combinations are still unique. Compositions 4(a) and 4(b), for example, have a common spectral component 410. In one embodiment, the compositions are chosen such that any two pilot tone sources can be distinguished from each other by at least two spectral components when n>2.

In one embodiment, the pilot tone sources realize multi-tones by providing a plurality of tones at substantially the same time. In an alternative embodiment, the multiple tones are generated sequentially, one at a time. This may be accomplished, for example, by providing an appropriate modulating input signal to a modulating input of a pilot tone source. In various embodiments, changing the value of the signal provided to the modulating input changes the frequency or the phase of the pilot tone source. The modulating input may be either a digital input or an analog input.

In one embodiment, the pilot tone source is a digitally controlled oscillator with a variable frequency. The digitally controlled oscillator generates a substantially sinusoidal waveform at a frequency determined by the value of digital code provided to the modulating input of the pilot tone source. The distinct frequencies of the multi-tone pilot tone are generated by repetitively providing a series of distinct digital codes to the modulating input of the pilot tone source and repeating the sequence.

In another embodiment, the modulating input is an analog input. The instantaneous frequency of the pilot tone source depends on the analog signal value presented to the modulating input. A stepped waveform such as a square wave presented to the modulating input results in a different instantaneous pilot tone frequency for each plateau of the stepped waveform. A square wave has two plateaus thus resulting in a binary frequency shift keyed pilot tone source. A stepped waveform with n plateaus or steps may be used to generate an n-ary frequency shift keyed pilot tone signal. The stepped waveform also contributes to the spectral composition of the resulting multi-tone pilot tone.

The pilot tone signatures may be differentiated by their spectral compositions. Different signatures can be generated by 1) varying the amplitude or height of the steps of the modulating waveform (i.e., different modulating waveforms as determined by analog or digital values), 2) modulating about different frequencies, or 3) changing the frequency of the modulating waveform.

Figure 5:
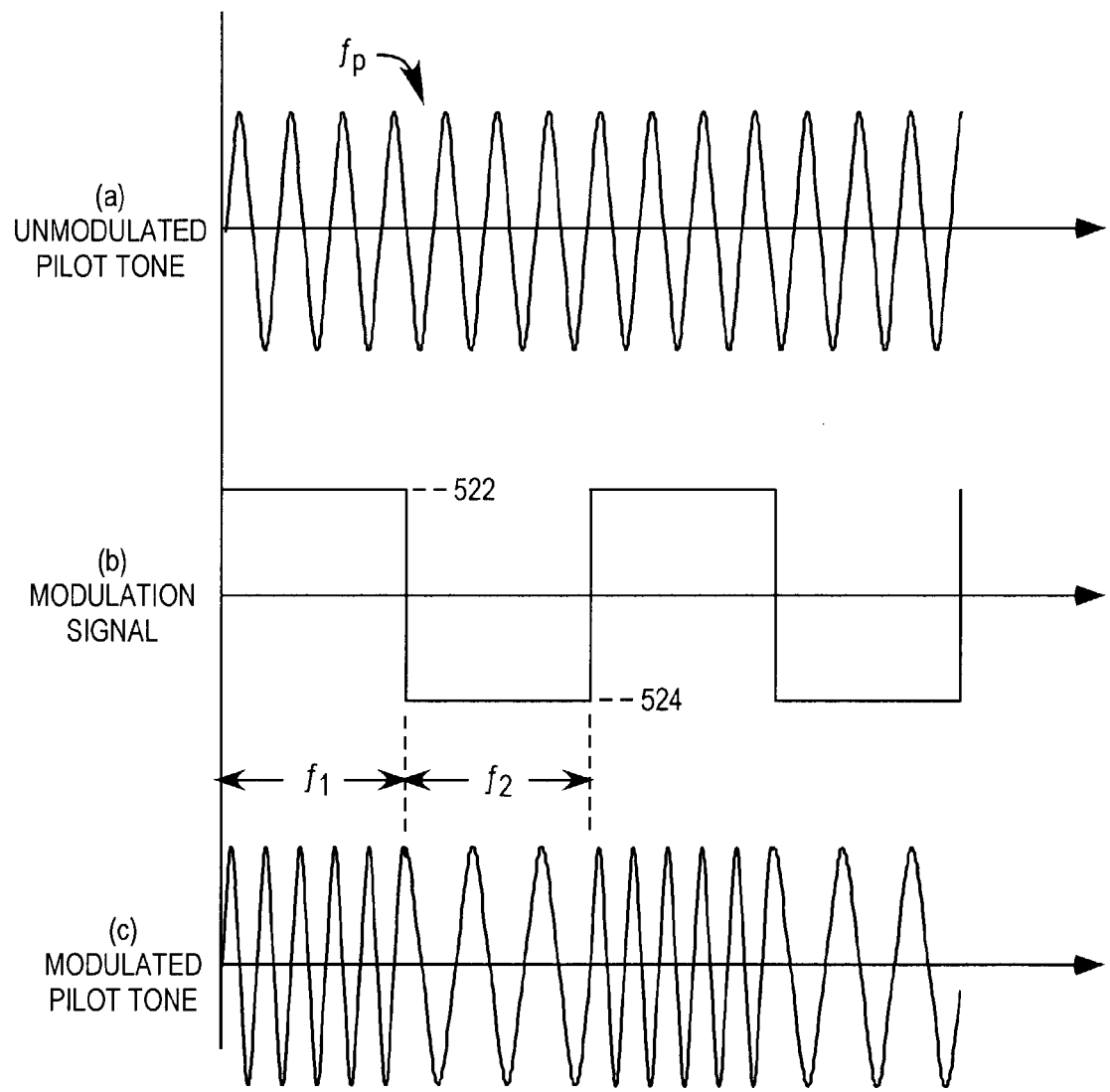
FIG. 5 illustrates one embodiment of a pilot tone source modulating waveform and resulting pilot tone.

FIG. 5 illustrates one embodiment of a frequency shift keyed pilot tone source. Waveform 5(a) illustrates a pilot tone source generating a substantially sinusoidal tone of constant frequency $f_p$. The spectral composition of waveform 5(a) is a single component at $F_p$ wherein $F_p=f_p$. Waveform 5(b) is a stepped waveform of frequency $f_m$. Waveform 5(c) illustrates the pilot tone resulting from application of the square wave provided to an analog modulating input of the pilot tone source.

The square wave of waveform 5(b) effectively accomplishes a binary frequency shift keyed (FSK) modulation at a frequency $f_m$ of the pilot tone source about a center frequency $f_c$. When the square wave has a first level 524, the pilot tone source generates a waveform of instantaneous frequency $f_1$, wherein $f_1-f_c=\Delta f_1$. When the square wave has a second level 522, the pilot tone source generates a waveform of instantaneous frequency $f_2$ wherein $f_c-f_2=\Delta f_2$. In one embodiment, the FSK modulation is coherent such that the phase of each frequency component is fixed with respect to a reference. In one embodiment, the transition between $f_1$ and $f_2$ is phase continuous.

In the illustrated embodiment, $\Delta f_1=\Delta f_2$ and each represents the frequency deviation from a center frequency, $f_c$. The spectral content of a binary frequency shift keyed pilot tone consists of a plurality of dominant components centered about $F_c$ wherein $F_c=f_c$ and separated from each other by a common displacement frequency, $\Delta F=f_m$. The relative amplitude of these frequency components is determined by the ratio of $$\frac{\Delta f}{f_m} = \beta.$$

In one embodiment, the levels of the square wave are selected so that $\Delta f \approx 1.602 f_m$ (i.e., $\beta \approx 1.1602$). Thus, for example, $f_1=f_c+1.1602f_m$, $f_2=f_c-1.1602f_m$. This results in 5 dominant equally spaced spectral components, each component separated from an adjacent component by $f_m$ wherein the three middle components have substantially the same amplitude and dominate the remaining spectral components at the highest and lowest frequencies of the five.

For example, consider binary shift keying at a frequency $f_m=10$ Hz to toggle between two instantaneous frequencies, $f_1$ and $f_2$ about a center frequency $$f_c = \frac{f_1 + f_2}{2} = 750250 \text{ Hz}.$$

Choosing $\Delta f \approx 1.1602 f_m = 11.602$ Hz produces $f_1=750261.6$ Hz and $f_2=750238.4$ Hz. The resulting spectral composition includes frequency components at 750250 Hz and multiples of $f_m$ from 750250 Hz (i.e., 750250±m10 Hz). The components of the first set of dominant components are located at 750240, 750250, and 750260 Hz. Due to the choice of $\beta$, the components of the first set have substantially the same amplitude, A1. The components of the second set of most dominant components are located at 750230 and 750270 Hz. The components of the second set also have substantially the same amplitude A2, wherein A2<A1.

Figure 6:
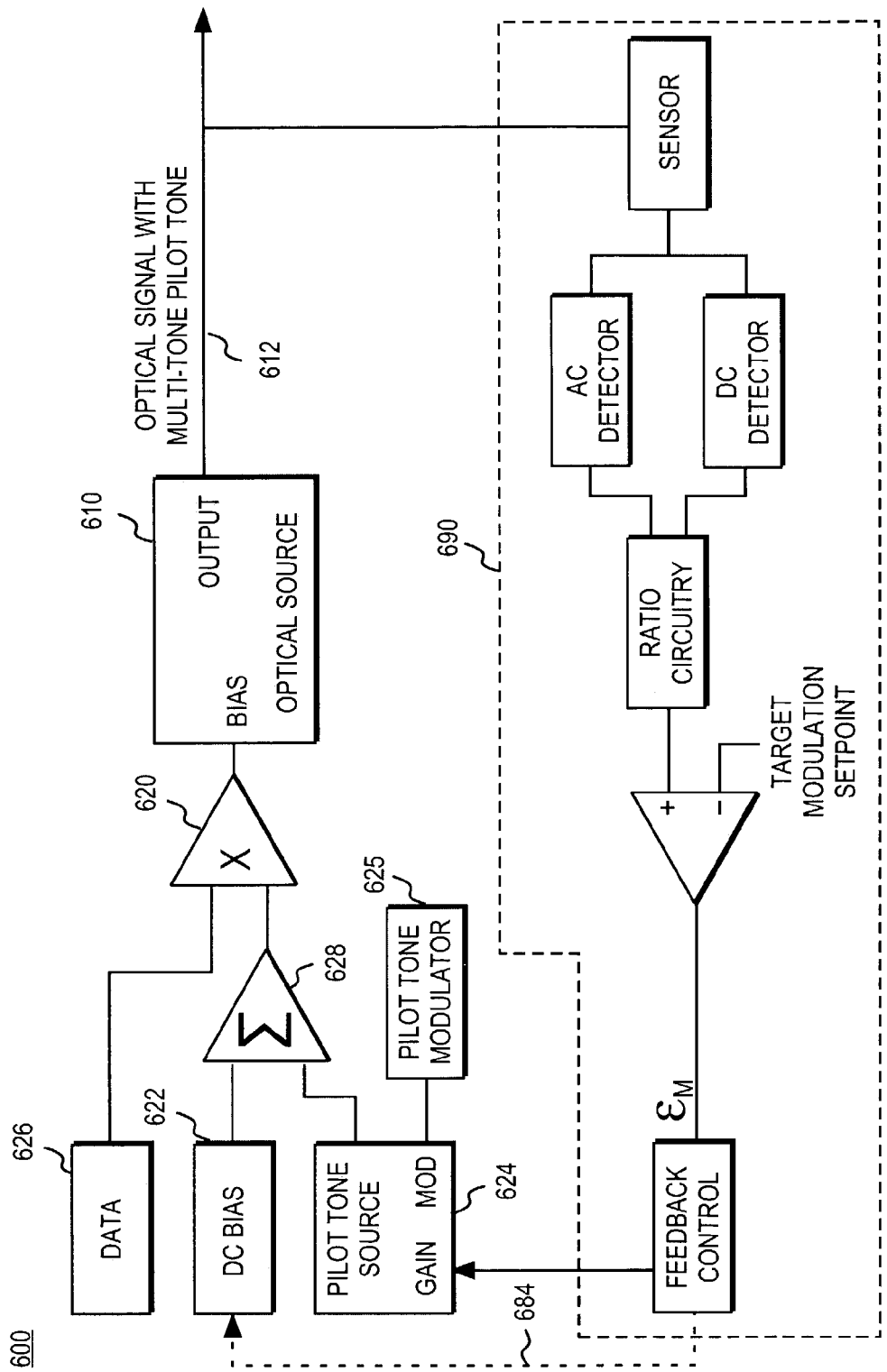
FIG. 6 illustrates one embodiment of an optical signal generation apparatus having a multi-tone pilot tone.

FIG. 6 illustrates one embodiment of an optical communication system 600 using a multi-tone pilot tone. The optical source 610 includes a bias input and an output 612. In one embodiment, optical source 610 generates predominately coherent optical signals. Alternatively, optical source 610 may provide non-coherent optical signals. In one embodiment, optical source 610 is a laser. In an alternative embodiment, optical source 610 comprises a light emitting diode.

A DC bias component is provided by DC bias 622. An AC component of the optical source bias is provided by pilot tone source 624. The AC and DC bias components are combined with summing amplifier 628. The data 626 and the output of summing amplifier 628 are provided to multiplier 620. The output of multiplier 620 is provided to the bias input of optical source 610. Optical source 610 generates an optical signal in accordance with the bias input. Accordingly, optical signal 612 includes any pilot tones provided by pilot tone source 624.

In an open loop control scheme, the DC bias and the pilot tone signal amplitude are set to achieve a desired modulation index, total optical output power, and ratio of pilot tone optical output power to total optical output power without the benefit of feedback to regulate these parameters. In a closed loop control scheme, a feedback path is provided for maintaining the optical output power and the ratio of pilot tone optical power to total optical output power.

Optional feedback path 690, provides closed loop control of the pilot tone signal, if desired. Feedback path 690 may be omitted if open loop control is adequate. Feedback path 690 provides a control input to at least a selected one of the DC bias 622 and the pilot tone source 624 (AC bias) to control the ratio. The feedback control 680 controls the ratio of the amplitude of the pilot tone source signal and the DC bias.

Various types of laser sources are available for optical source 610. In one embodiment, optical source 610 is an electro-absorptive (EA) laser. The first order response of the back-facet diode of an EA laser is substantially independent of the on-off keyed data communicated by the laser. Thus the on-off keyed data does not affect calculation of the AC component of the optical signal attributable to the pilot tone signal. The back-facet diodes of other laser types, however, sense the on-off keyed data thus complicating the determination of the AC component attributable to just the pilot tone signal when data is being transmitted.

For example, the back-facet diode of a direct modulated (DM) laser senses an optical signal including the pilot tone signal and any data being transmitted. As a result, analog AC detection must be optimized differently between EA and DM lasers.

Figure 7:
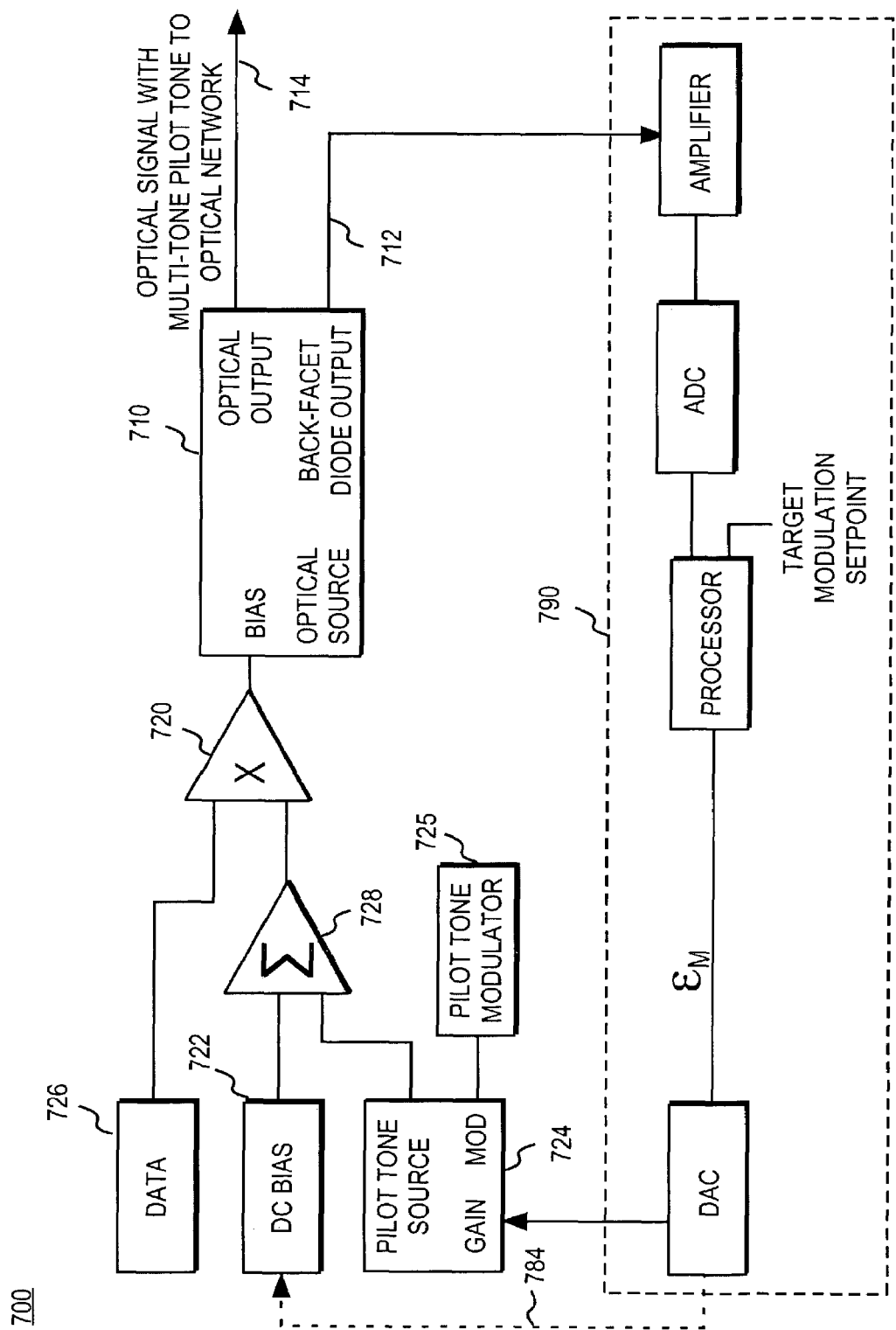
FIG. 7 illustrates another embodiment of an optical signal generation apparatus having a multi-tone pilot tone.

FIG. 7 illustrates apparatus 700 including an optional digital control feedback loop 790 controlling the pilot tone signal amplitude. DC bias 7422 and pilot tone source 724 (AC bias) are combined using summing amplifier 728. The data 726 and the output of the summing amplifier 728 are combined using multiplier 720. The output of multiplier 720 is provided to the bias input of optical source 710. Optical source 710 generates an optical signal 712 including the pilot tone signal in accordance with the optical source bias input. In various embodiments, the optical source 710 is a non-coherent light source such as a light emitting diode. Alternatively, optical source 710 may be a coherent light source such as an EA or a DM laser. Optional feedback loop 790 provides control for at least one of the DC bias 722 and the pilot tone source 724.

In this embodiment, the optical source 710 provides a back-facet diode output 712 distinct from the optical signal 714 otherwise intended for the optical network such that a separate external sensor is not required. Thus, optical sensing is accomplished using the back-facet diode of the optical source 710.

In contrast to the analog approach of FIG. 6, one advantage of the digital signal processing approach is that the same control loop portions are used for both AC and DC detection. The use of the same hardware for AC and DC detection is advantageous because it minimizes signal path differences that otherwise contribute to errors that limit the accuracy of the closed loop control. Another advantage of the DSP approach is that any differences between applications for different types of optical sources (e.g., EA and DM lasers) can be accommodated without a change in hardware.

Referring to FIGS. 6 and 7, the existence of a particular multi-tone signal indicates the presence of an associated channel in a DWDM application. The optical power of the associated channel can be calculated by measuring the power of the multi-tone signal component of the optical signal given the established ratio between the multi-tone signal and the optical signal.

Figure 8:
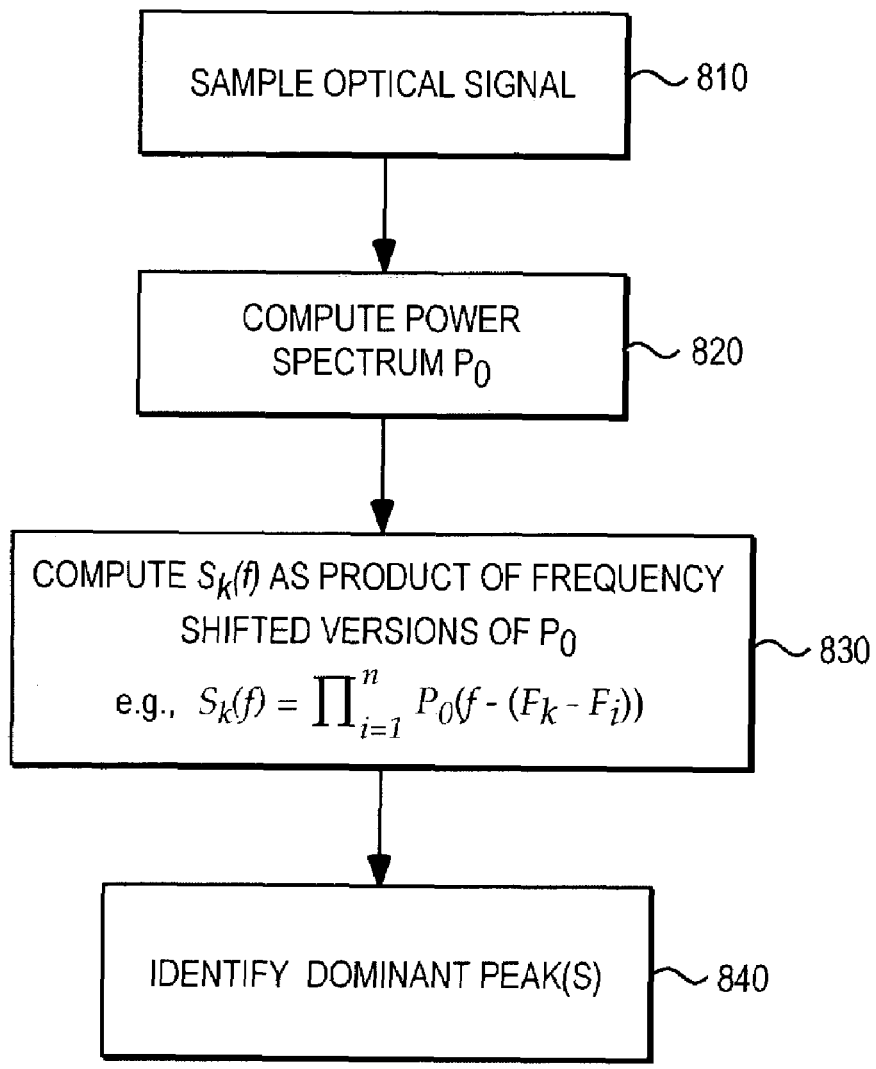
FIG. 8 illustrates one embodiment of a method for determining the presence of a selected multi-tone signal.

FIG. 8 illustrates one embodiment of a method for determining the presence of a given multi-tone signal. A selected multi-tone pilot tone signature is identified by its dominant spectral components $\{F_1 \ldots F_n\}$.

The optical signal is sampled in step 810 to determine the presence of a selected multi-tone signature. The optical signal may be a composite optical signal comprising a plurality of channels, each having an associated multi-tone pilot tone. Sampling at least twice as high as the greatest frequency component of the selected multi-tone signature is performed in one embodiment (i.e., sample rate$\geq$max$\{F_1 \ldots F_n\}$). The power spectrum is calculated in step 820 as $P_0(f)$ In one embodiment, the power spectrum is calculated about an average frequency $f_a$, wherein $$f_a = \frac{1}{n}\sum_{i=1}^{n} F_n.$$

A product of frequency shifted versions of $P_0(f)$ is computed as $S_k(f)$ in step 830. In one embodiment, $S_k(f)=\Pi_{i=1}^{n} P_0(F_k-F_i))$, where $k\in\{1 \ldots n\}$. This is a form of correlation given that $P_0(f)$ is multiplied by frequency shifted copies of itself. In one embodiment, n is odd and $$k = \frac{n+1}{2}$$

resulting in a product that emphasizes centralized dominant components present at the middle of the range $\{F_1 \ldots F_n\}$. In one embodiment, $S_k(f)$ is calculated as a discrete function $S_k(f)=\Pi_{i=1}^{n} P_0(f_j|_{j=1}^{n}-(F_k-F_i))$.

Binary FSK results in a plurality of equally spaced spectral components such that $\Delta F$ between any two adjacent components is constant. For pilot tone signatures produced through binary FSK, the product $S_k(f)$ can be computed by duplicating the power spectrum $P_0(f)$ to produce n frequency shifted copies $(P_1 \ldots P_n)$ including one $P_k$ identical to $P_0(f)$. The spectral content of each copy is displaced from a preceding copy by $\Delta F$. The product is then calculated as $S_k(f)=\Pi_{i=1}^{n} P_i$.

If the tones or frequencies associated with the selected multi-tone pilot tone signature are present in the sampled optical signal, the product will have peaks at those frequencies. Dominant peaks are identified in step 840. The presence of a peak at $F_k$ indicates the presence of the selected multi-tone pilot tone signature. The product $S_k(f)$ may be thresholded in step 840 to identify the presence of any peak at $F_k$.

Figure 9:
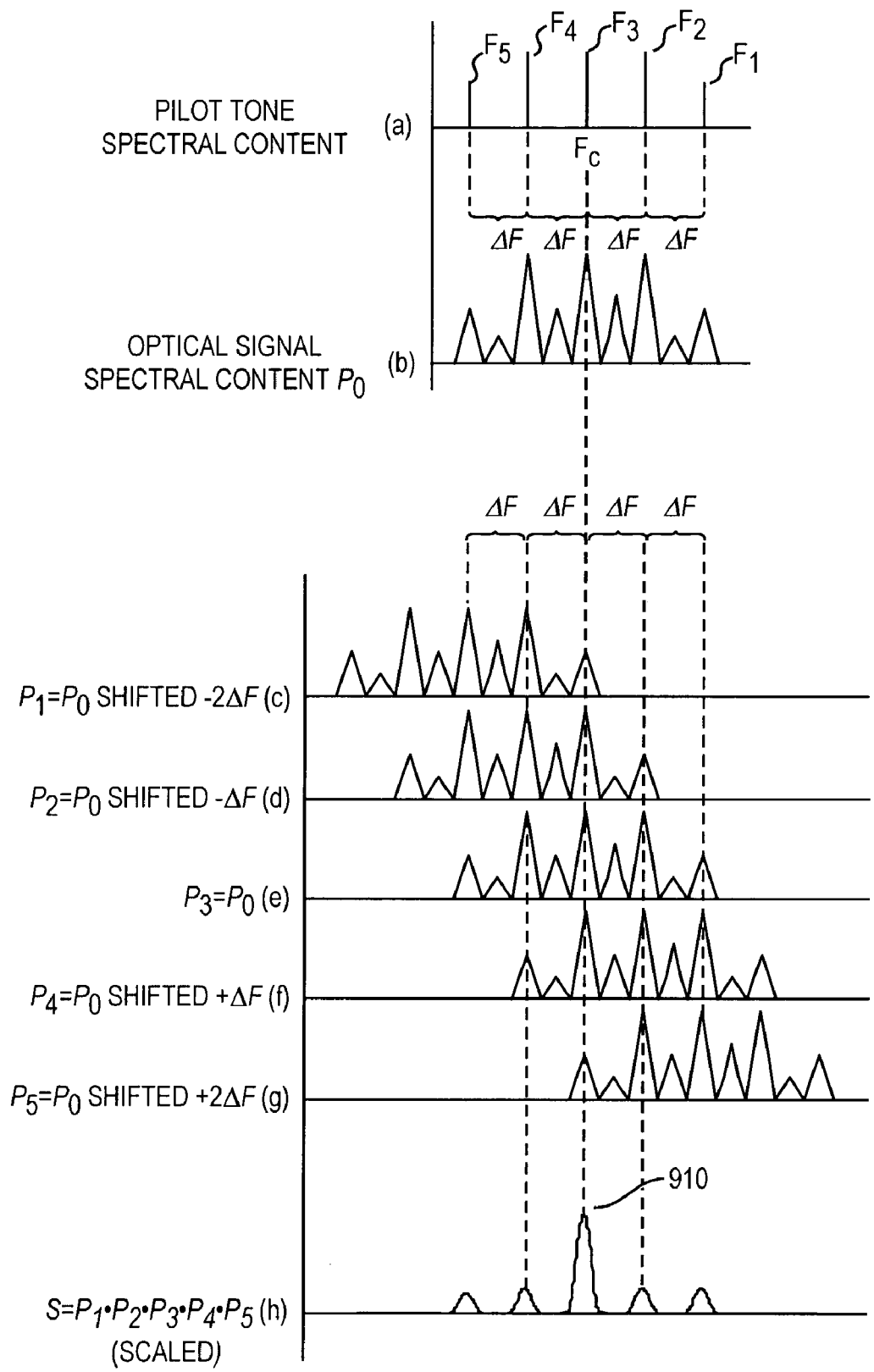
FIG. 9 illustrates an example of determining the presence of a multi-tone pilot tone.

FIG. 9 illustrates an example of identifying the presence of the multi-tone signal in an optical signal. Waveform (a) represents the spectral content of a selected multi-tone pilot tone signature. Although more than 5 peaks are present, only the most dominant peaks are counted for purposes of analysis and identification (i.e., n=5). Waveform (b) represents an original measured spectral content $P_0(f)$ of an optical signal modulated by the pilot tone. The optical signal may also include data.

Waveforms (c)-(g) represent frequency shifted copies of the original $P_0$. Each copy $(P_1-P_5)$ is displaced in frequency from the original $P_0$ in accordance with the difference between adjacent spectral components indicated by the waveform (a). In the illustrated embodiment, adjacent spectral components of waveform (a) are separated by a common $\Delta F$ so that $P_1$-$P_5$ are shifted by from each other by integer multiples of a displacement frequency, $\Delta F$.

In the illustrated embodiment, $P_3$=$P_0$ (i.e., k=3). Waveform (h) is the product ($S_3$) of the copies $P_1$-$P_5$. In particular, $S_3$=$P_1 \cdot P_2 \cdot P_3 \cdot P_4 \cdot P_5$ where $P_1$=$P_0$(f−($F_3$−$F_5$)), $P_2$=$P_0$(f−($F_3$−$F_4$)), $P_3$=$P_0$(f), $P_4$=$P_0$(f−($F_3$−$F_2$)), $P_5$=$P_0$(f−($F_3$−$F_1$)). In one embodiment, a discrete $S_3$(f) is computed as $\Pi_{i=1}^{n}P_0(F_i)$. Waveform (h) is scaled for purposes of illustration. $S_k$(f) exhibits dominant peaks corresponding to the presence of the spectral components of the selected multi-tone pilot tone signature.

A threshold operation may be used to identify the existence and location of any dominant peaks. A single peak 920 significantly greater than the other peaks 922, 924 identifies $F_k$ of the multi-tone pilot tone. If even one of the n peaks that identifies the selected multi-tone signature is absent in $P_0$, the product $S_k$(f) will be zero at $F_k$. Thus the presence of a peak at $F_k$ is necessary and sufficient to verify the presence of the selected multi-tone pilot tone.

Once the presence of the selected multi-tone pilot tone signature associated with the selected channel is confirmed, the channel power may be determined. In one embodiment, only a subset of the dominant frequencies is used to determine the pilot tone power. Referring to FIG. 9, only $P_0(F_2)$, $P_0(F_3)$, and $P_0(F_4)$ are used for determining the pilot tone power.

To provide better immunity from the effect of payload data on $P_0$(f), the power is calculated based on the median of $P_0(F_2)$, $P_0(F_3)$, and $P_0(F_4)$. This approach provides immunity in the event one of $P_0(F_2)$, $P_0(F_3)$, and $P_0(F_4)$ is impacted by payload data. Generally, immunity from $$\frac{p+1}{2}-1$$

(p odd) or $$\frac{p}{2}-1$$

(p even) impacted tones is provided by this approach where $p \leq n$. The set is sorted to form the indexed sorted set y(i) where i=1 ... p. The median is calculated as $$y\left(\frac{p+1}{2}\right)$$

for p odd and $$\frac{1}{2}\left[y\left(\frac{p}{2}\right)+y\left(\frac{p}{2}+1\right)\right]$$

for p even. Given the relationship between pilot tone power and optical channel power, the optical power of the selected channel may be computed using the pilot tone power.

The generation of the multi-tone pilot tone and the computation and analysis of the power spectrum may be performed by a processor under programmatic control. For example, pilot tone modulators 625 and 725 of FIGS. 6 and 7, respectively may be processors controlling the pilot tone sources to produce the multi-tone pilot tone. Similarly, the described methods may be implemented using processor executable instructions provided to the processor from a storage medium.

In particular, the computer readable storage medium may store processor executable instructions for generating the multi-tone pilot tone signal. In one embodiment, the processor executable instructions instruct the processor to generate the multi-tone pilot tone through frequency or phase shift keying. Similarly, the processor executable instructions may instruct the processor to perform the steps of the method of identifying the presence of a selected multi-tone pilot tone in a composite optical signal. Examples of storage mediums suitable for storing the processor executable instructions include volatile storage mediums such as random access memory as well as nonvolatile storage mediums such as read only memories, compact disks, magnetic disks, and magnetic tape.

Methods and apparatus for identifying the presence and power of individual channels in a composite optical signal. In general, a multi-tone pilot tone provides a unique multi-tone pilot tone signature for each channel. The multi-tone signature may be superimposed on a given channel using a plurality of tone generators substantially simultaneously. Alternatively, the individual tones may be superimposed one at a time, sequentially onto an optical channel. Modulation such as frequency shift keying or phase shift keying may be applied to achieve a multi-tone pilot tone signature.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of communicating an optical signal, comprising:
   a) superimposing a pilot tone signature on a selected channel of an optical signal having a plurality of channels, wherein the pilot tone signature is distinct from that associated with any other channel of the plurality of channels, wherein the pilot tone signature comprises a plurality (n) of tones;
   b) computing $S_k$(f) as a product of a plurality of frequency shifted versions of a power spectrum $P_0$(f) of the optical signal; and
   c) thresholding $S_k$(f) to identify a dominant peak indicative of the presence of the pilot tone signature.

2. The method of claim 1 wherein the plurality of tones is generated substantially simultaneously.

3. The method of claim 1 wherein the plurality of tones is generated sequentially, one at a time.

4. The method of claim 1 wherein a) further comprises frequency shift keying a pilot tone source at a modulation frequency $f_m$ to produce a plurality of distinct instantaneous frequencies including a first instantaneous frequency $f_1$ and a second instantaneous frequency $f_2$, wherein $f_1 > f_2$.

5. The method of claim 4 wherein $f_1$ and $f_2$ deviate from a center frequency $$f_c = \frac{f_1 + f_2}{2}$$

by a deviation frequency $\Delta f$ such that $f_2+\Delta f=f_c=f_1-\Delta f$, wherein $$\beta = \frac{\Delta f}{f_m} \approx 1.1602.$$

6. The method of claim 1 wherein a) further comprises phase shift keying a pilot tone source.

7. The method of claim 1 wherein n is odd.

8. The method of claim 1 wherein n is even.

9. The method of claim 1 wherein the dominant spectral components associated with the pilot tone signature have substantially a same amplitude.

10. The method of claim 1 wherein an amplitude of the dominant spectral components associated with the pilot tone signature varies.

11. A method of communicating an optical signal, comprising:
 a) providing a plurality of optical signals, each associated with a distinct channel of a composite optical signal;
 b) superimposing a distinct pilot tone signature on each channel, wherein each pilot tone signature comprises a plurality (n) of tones;
 c) computing $S_k(f)$ as a product of a plurality of frequency shifted versions of a power spectrum $P_0(f)$ of the composite optical signal; and
 d) thresholding $S_k(f)$ to identify a dominant peak indicative of the presence of a selected pilot tone signature.

12. The method of claim 11 wherein n is odd.

13. The method of claim 11 wherein n is even.

14. The method of claim 11 wherein the plurality of tones is generated substantially simultaneously.

15. The method of claim 11 wherein the plurality of tones is generated sequentially, one at a time.

16. The method of claim 11 wherein b) further comprises one of a frequency shift keying and a phase shift keying of a pilot tone source.

17. A method of detecting a selected multi-tone pilot tone signature having a plurality of dominant spectral components $\{F_1 \ldots F_n\}$ comprising:

a) computing $S_k(f)$ as a product of a plurality of frequency shifted versions of a power spectrum $P_0(f)$ of a sampled optical signal; and
 b) thresholding $S_k(f)$ to identify a dominant peak indicative of the presence of the selected multi-tone pilot tone signature.

18. The method of claim 17 wherein a) includes computing $$S_k(f) = \prod_{i=1}^{n} P_0(f-(F_k-F_i)), \text{ where } k \in \{1\ldots n\}.$$

19. The method of claim 17 wherein a) includes the step of computing $$S = \prod_{1}^{M} P_i,$$

wherein each $P_i$ is a frequency shifted copy of $P_0$, wherein each copy is shifted from $P_0$ by an integer multiple of a pre-determined displacement frequency $\Delta F$.

20. The method of claim 17 wherein n is odd.

21. The method of claim 17 wherein n is even.

22. The method of claim 17 wherein n=5.

23. A computer readable storage medium storing processor executable instructions for detecting a selected multi-tone pilot tone signature, wherein upon execution, the processor executable instructions instruct a processor to perform the steps of:
 a) sampling an optical signal;
 b) computing a power spectrum $P_0(f)$ of the sampled optical signal;
 c) computing $S_k(f)$ as a product of a plurality of frequency shifted versions of $P_0(f)$; and
 d) thresholding $S_k(f)$ to identify a dominant peak indicative of the presence of the selected multi-tone pilot tone signature.

* * * * *